United States Patent [19]

Owens

[11] Patent Number: 4,909,644
[45] Date of Patent: Mar. 20, 1990

[54] BEARINGS
[75] Inventor: Austin W. Owens, Pembridge, England
[73] Assignee: Lucas Industries public limited company, Birmingham, England
[21] Appl. No.: 262,939
[22] Filed: Oct. 18, 1988

Related U.S. Application Data
[63] Continuation-in-part of Ser. No. 118,915, Nov. 10, 1987, abandoned.

[30] Foreign Application Priority Data
Nov. 14, 1986 [GB] United Kingdom ................. 8627217

[51] Int. Cl.$^4$ ........................ F16C 33/38; F16C 19/10
[52] U.S. Cl. .................................. 384/614; 188/71.9; 384/621
[58] Field of Search ............... 384/614, 621, 623, 523, 384/531, 529, 532, 572, 575, 577; 188/71.9

[56] References Cited
U.S. PATENT DOCUMENTS

| | | | |
|---|---|---|---|
| 449,968 | 4/1891 | Simonds | 384/614 |
| 1,135,044 | 4/1915 | Olsson | 384/614 |
| 1,182,795 | 5/1916 | Rogers | 384/614 |
| 1,269,087 | 6/1918 | Keiper | 384/614 |
| 1,840,462 | 1/1932 | Moittié188 | 130/ |
| 3,414,341 | 12/1968 | Murphy | 384/621 X |
| 4,056,173 | 11/1977 | Farr | 188/71.9 |
| 4,321,986 | 3/1982 | Thistleton | 188/71.9 X |
| 4,399,894 | 8/1983 | Tribe | 188/71.9 |
| 4,429,768 | 2/1984 | Margetts et al. | 188/71.9 |

Primary Examiner—Thomas R. Hannon
Attorney, Agent, or Firm—Scrivener and Clarke

[57] ABSTRACT

A bearing wherein the size of the rotatable components, i.e. balls or needle rollers, can be maximized while the cage dimensions are minimized, thus aiding overall design for a mechanical device in which the bearing is located. The bearing comprises a cage constructed of flat flexible material, the cage having a generally U-shaped transverse cross-section with a number of rotatable components located between the arms of the generally U-shaped cross-section cage, each component extending partially through aligned apertures in each of said arms. When inserted between two facing helical surfaces and in engagement with both the cage automatically conforms to the pitch of the helical surfaces without the necessity of being pre-shaped to conform thereto.

11 Claims, 3 Drawing Sheets

BEARINGS

This application is a continuation-in-part, of application Ser. No. 118,915, filed Nov. 10, 1987 now abandoned.

The present invention relates to a bearing.

In particular the present invention relates to a bearing in the form of a ball race or needle roller bearing wherein a number of balls or needle rollers are rotatably supported in a cage. With known constructions of this type the cage conventionally has relatively large dimensions as compared to the balls or needle rollers and this can provide design problems in mechanical devices using such bearings. For example, a ball race of helical configuration is used in a mechanically operable brake actuator, the ball race engaging facing helical surfaces on the facing ends of two coaxial cylindrical sleeves whereby rotation of one sleeve causes axial movement of said sleeve relative to the other sleeve. However the overall size of the bearing is limited by the radial space between respective actuator components, the size of which is dictated by the available space on the vehicle. With radial limitations the use of conventional cages precludes the use of increased diameter balls or rolling elements which in use would tend to reduce the bearing loads and stresses on the helical facing ends of the sleeves, and on the individual balls or rolling elements.

One of the aims of the present invention is to provide a bearing wherein the cage is designed such that for given space limitations the diameter of the rolling elements may be maximised, i.e. balls or needle rollers, as compared to prior art arrangements.

Another aim of the invention is to provide a bearing wherein the cage is split and initially formed flat but is flexible, and may also be resilient, so that the bearing automatically conforms to the pitch of facing helical surfaces when the bearing engages said surfaces.

According to the present invention there is provided, a bearing comprising a cage constructed of a resilient material, the cage having a generally U-shaped transverse cross-section with a number of rotatable components located between the arms of the generally U-shaped cross-section cage, each component extending partially through aligned apertures in each of said arms.

In one embodiment of the present invention the cage is formed as an annular ring with the U-shaped cross-section having a base region which is directed radially inwardly of the ring, the open end of the U-shaped cross-section being thus directed radially outwardly of the ring. The arms of the U-shaped cross-section are parallel to each other and each arm is provided with a number of spaced apart circular apertures; corresponding apertures in each arm being coaxially aligned with each other. Due to the resilient nature of the cage material metal bearing balls can be pressed between the arms of the U-shape, and located so that each ball projects partially through two aligned apertures. Preferably the balls and apertures are dimensioned so that the bearing balls are merely located in the apertures rather than forcibly gripped by the said base region being tensioned, and preferably the apertures are spaced apart so that adjacent balls may touch or are slightly spaced from each other in the completed bearing. By virtue of this simple cage construction the cage dimensions can be chosen such that the diameter of the balls may be optimised, thereby reducing the loads and stresses on the bearing balls and associated components in a given diameter bearing and thereby increasing the life of the bearing as compared to prior art constructions.

In a modified embodiment, the annular ring is broken on its circumference, with adjacent end regions deflected axially of the ring, in opposite directions, to form a helical bearing suitable for use in a mechanically operable brake actuator as previously mentioned. The present invention enables larger diameter ball bearings to be used in a previous design of helical ball ramp actuator and thus enhances bearing life by reducing the loads and stresses at the ball track interface. In this embodiment the cage is initially formed flat but is flexible, and may also be resilient, so that when the bearing is inserted between two facing helical surfaces it automatically conforms to the pitch of the helix defined by said surfaces. Thus bearings of a given size may be used with helices of varying pitches without the necessity of preforming the cage to match a particular pitch. This arrangement eliminates an additional manufacturing step resulting in decreased cost.

In the above described embodiments the base region of the generally U-shaped cross-section faces radially inwardly of the said annular ring. Alternatively the cage may be such that the said base region faces radially outwardly of the said annular ring. Further, the said aligned apertures may be designed to engage needle rollers as opposed to the said bearing balls, or a mix of rollers and balls, e.g. alternatively arranged.

In any of the above embodiments of the present invention the said aligned apertures are preferably equi-spaced apart from each other in the arms of the U-shaped cross-section, they may alternatively be arranged in spaced apart groups, as desired.

Further, the case may be made of any suitable resilient material e.g. a plastics material or spring steel.

The present invention will now be further described, by way of example, with reference to the accompanying drawings, in which.

Figure 1:
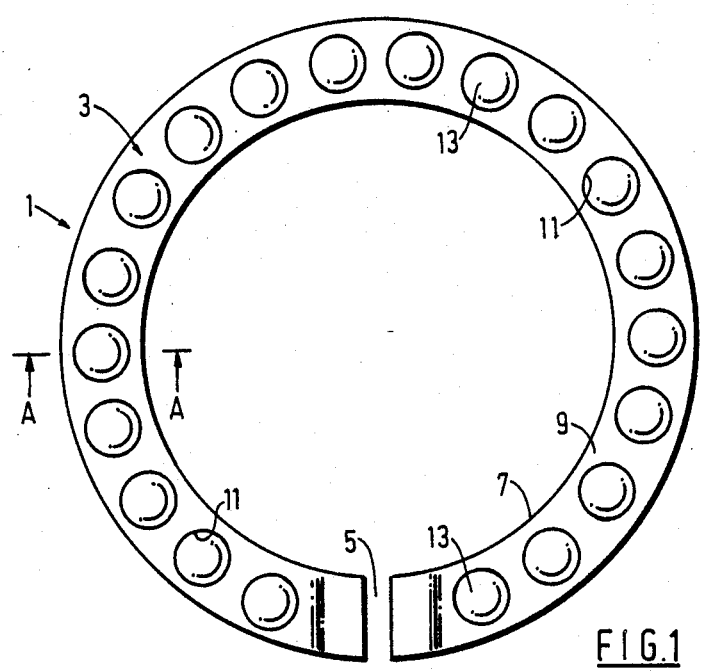
FIG. 1 is a plan view of one embodiment of the present invention.
Figure 2:
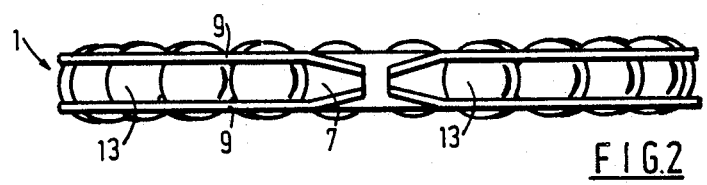
FIG. 2 is a front view of the embodiment of FIG. 1.
Figure 3:
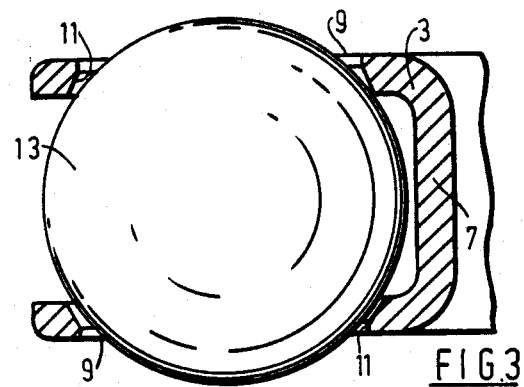
FIG. 3 is an enlarged cross-sectional view taken along line A—A in FIG. 1.

The embodiment of the present invention illustrated in FIGS. 1 to 3 of the accompanying drawings comprises a cage 1 which is in the form of an annular ring 3 broken as at 5. In an alternative embodiment (not shown) the ring is complete. As best seen in FIG. 3, the broken ring 3 has a generally U-shaped transverse cross-section with the base region 7 of the U-shape facing radially inwardly of the ring 3, and the arms 9 of the U-shape, projecting parallel to each other, radially outwardly of the ring 3. Considering the U-shape cross-section, each arm 9 has a number of equi-spaced apart circular apertures 11, with corresponding apertures 11 in each arm 9 being coaxially aligned with each other. In an alternative embodiment (not illustrated) the apertures 11 can be positioned in groups of a desired number e.g. in spaced apart groups of these apertures. Engaged between the said arms 9 and projecting partially through each pair of aligned apertures 11 is a bearing ball 13 adjacent bearing balls 13 touching each other. This design of bearing thus optimizes the cage dimensions as compared to the dimension of the bearing ball 13. The optimum usage of the space available is thus achieved, thereby optimizing bearing life.

Figure 4:
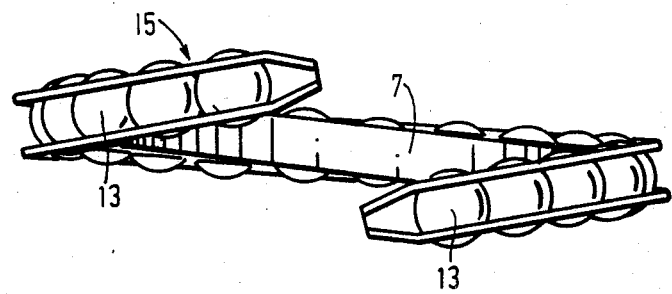
FIG. 4 is a front view of another embodiment of the present invention.
Figure 5:
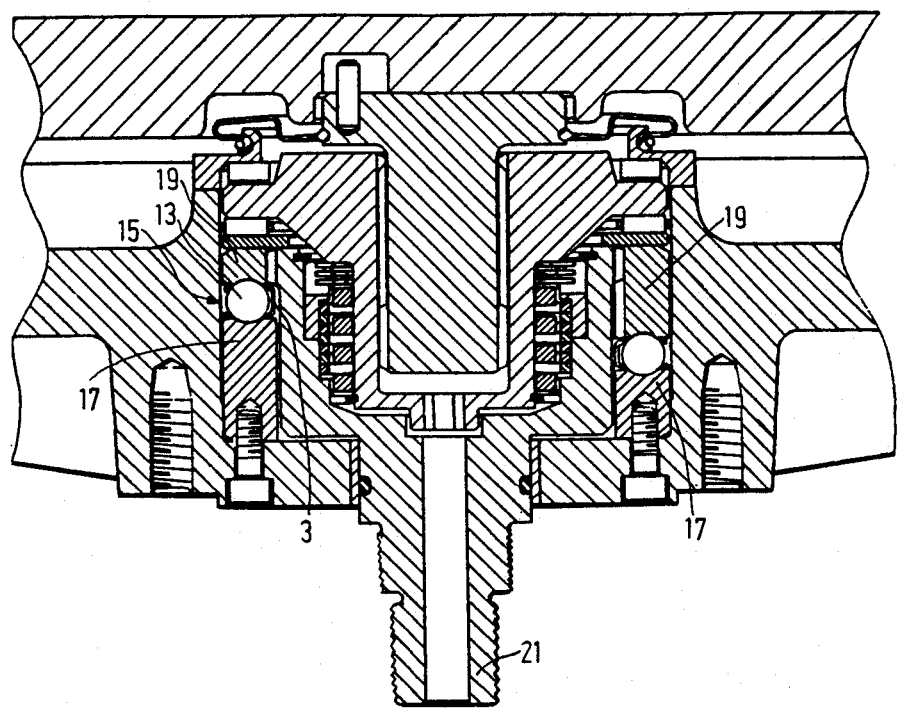
FIG. 5 is a cross-sectional view of a mechanically operable brake actuator incorporating the embodiment of the present invention illustrated in FIG. 4.

In an alternative embodiment of the present invention illustrated in FIGS. 4 and 5 of the accompanying drawings, the broken annular ring 3 is formed as a helical ball race 15 with the same basic cross-sectional construction as illustrated in FIG. 3. As evident in FIG. 5 the helical ball race 15 can be used with advantage in a helical ball ramp assembly in a mechanical brake actuator 17, the helical ball race 15 being located between facing helical end faces of two cylindrical sleeves 17, 19. Rotation of one sleeve 19 by means of shaft 21, thus causes axial movement of the other sleeve 19 via the ball race 15; the other sleeve 17 being keyed against rotation. As can be seen from FIG. 5 the radial space for the ball race 15 in the helical ball ramp assembly between the shaft 21 and the actuator housing is small, and by virtue of the bearing construction of the present invention, the size of the bearing balls 13 is maximized, thereby reducing bearing load and enhancing bearing life.

Figure 6:
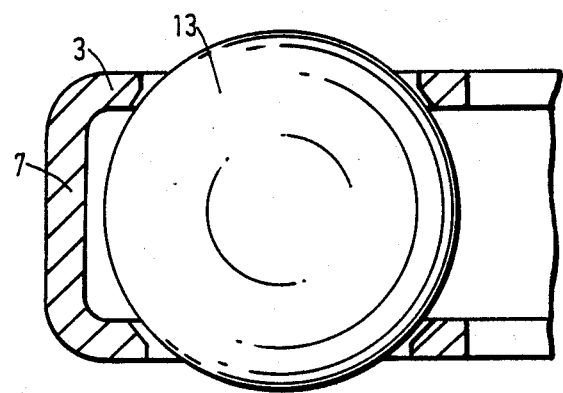
FIG. 6 is an enlarged cross-sectional view of part of a further embodiment of the present invention.

Whilst in the above described embodiments of the present invention, the said base region 7 of the U-shaped cross-section of the ring 3 faces inwardly of the ring, in alternative embodiments (see FIG. 6) the base region 7 can face outwardly of the ring 3.

The cage 1 is made of a resilient material e.g. spring steel or a suitable plastics material, the resilience of the cage material enabling bearing balls to be simply forced between the arms 9 into the apertures 11. Assembly of the bearing is therefore simple and relatively inexpensive.

Instead of being formed as a helical ball race, the flat cage of FIG. 2 in accordance with the invention, may be flexible, as well as resilient, whereby when the flat bearing of FIG. 2 having the break 5 is inserted between two facing helical surfaces such as those on the ball ramp assembly of FIG. 5, the adjacent end region of the ring are deflected axially of the ring in opposed directions and the bearing automatically conforms with the pitch of the helix so that it is not necessary to pre-shape the cage to the helix pitch. Thus a bearings of a given size may be used with helical ramps whose pitches may vary over a wide range.

Figure 7:
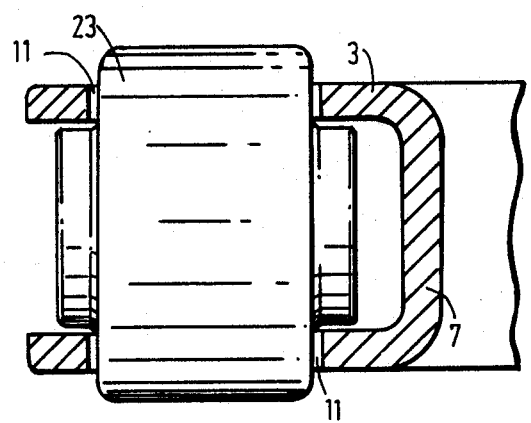
FIG. 7 is an enlarged cross-sectional view of a still further embodiment of the present invention.

In all of the above described embodiments the said apertures 11 are circular and dimensioned to retain bearing balls 13 whilst not firmly gripping the balls 13 i.e. the balls and apertures are dimensioned to not tension the base region 7. However, within the scope of the present invention, needle rollers 23 (see FIG. 7) can be substituted for the said bearing balls 13, with the apertures 11 being of a suitably dimensioned rectangular configuration.

The present invention thus provides a bearing which is simple and relative inexpensive to manufacture and assemble, whilst also optimizing the use of available space to thus reduce bearing load and enhance bearing life.

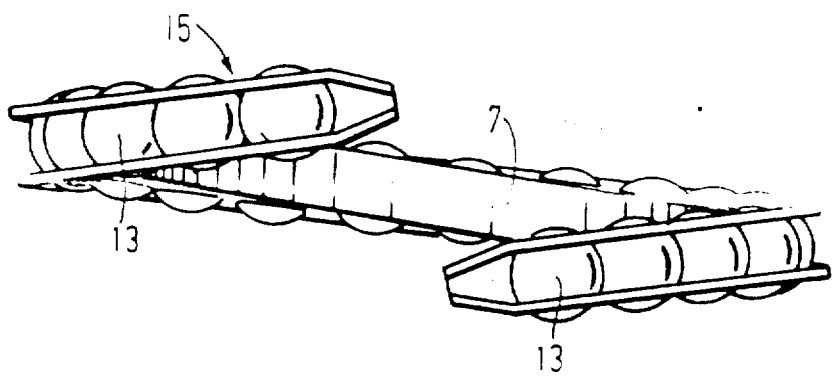

I claim:

1. A bearing comprising a flat cage constructed as an annular ring of flexible resilient material and having a generally U-shaped transverse cross-section including parallel arms and a base region to which said arms are resiliently joined, a number of rotatable components located between the arms of the generally U-shaped cross-section cage, each component extending partially through aligned apertures in each of said arms, said annular ring being broken on its circumference with adjacent end regions being deflected axially of the ring automatically by engagement of said flat cage with facing helical surfaces whereby said bearing conforms automatically to the pitch of said surfaces and without the necessity of being preshaped to conform thereto.

2. The bearing according to claim 1, wherein said base region is directed radially inwardly of the ring, the open end of the U-shaped cross-section being thus directed radially outwardly of the ring.

3. The bearing according to claim 1, wherein said base region is directed radially outwardly of the ring, the open end of the U-shaped cross-section being thus directed radially inwardly of the ring.

4. A bearing according to claim 1, wherein the apertures are circular and rotatable components in the form of metal bearing balls are passed between the arms of the U-shape and located so that each ball projects through two aligned apertures.

5. A bearing according to claim 4, wherein adjacent balls touch each other.

6. A bearing according to claim 4, wherein adjacent balls are spaced apart from each other.

7. A bearing according to claim 1, wherein the rotatable components are in the form of rollers, the apertures being suitably designed to allow the curved surface of each roller to pass partially through each of two aligned apertures.

8. A bearing according to claim 1, wherein the apertures are equi-spaced apart from each other.

9. The bearing according to claim 1, wherein the resilient material is spring steel.

10. The bearing according to claim 1, wherein the resilient material is a plastics material.

11. A bearing according to claim 1, when installed in a brake actuator as a helical ball race located between facing helical end faces of two cylindrical sleeves, only one of said sleeves being rotatable to thus drive the other sleeve in an axial direction.

* * * * *

UNITED STATES PATENT AND TRADEMARK OFFICE
CERTIFICATE OF CORRECTION

PATENT NO. : 4,909,644

DATED : Mar. 20, 1990

INVENTOR(S) : Austin W. Owens

It is certified that error appears in the above-identified patent and that said Letters Patent is hereby corrected as shown below:

The title page showing the illustrative figure should be deleted to appear as per attached title page.

Signed and Sealed this

Sixth Day of August, 1991

Attest:

*Attesting Officer*

HARRY F. MANBECK, JR.

*Commissioner of Patents and Trademarks*

United States Patent [19]

Owens

[11] Patent Number: 4,909,644

[45] Date of Patent: Mar. 20, 1990

[54] BEARINGS

[75] Inventor: Austin W. Owens, Pembridge, England

[73] Assignee: Lucas Industries public limited company, Birmingham, England

[21] Appl. No.: 262,939

[22] Filed: Oct. 18, 1988

Related U.S. Application Data

[63] Continuation-in-part of Ser. No. 118,915, Nov. 10, 1987, abandoned.

[30] Foreign Application Priority Data

Nov. 14, 1986 [GB] United Kingdom ............... 8627217

[51] Int. Cl.4 ................... F16C 33/38; F16C 19/10
[52] U.S. Cl. .................................. 384/614; 188/71.9; 384/621
[58] Field of Search ............ 384/614, 621, 623, 523, 384/531, 529, 532, 572, 575, 577; 188/71.9

[56] References Cited

U.S. PATENT DOCUMENTS

| 449,968 | 4/1891 | Simonds | 384/614 |
|---|---|---|---|
| 1,135,044 | 4/1915 | Olsson | 384/614 |
| 1,182,795 | 5/1916 | Rogers | 384/614 |
| 1,269,087 | 6/1918 | Keiper | 384/614 |
| 1,840,462 | 1/1932 | Moittié188 | 130/ |
| 3,414,341 | 12/1968 | Murphy | 384/621 X |
| 4,056,173 | 11/1977 | Farr | 188/71.9 |
| 4,321,986 | 3/1982 | Thistleton | 188/71.9 X |
| 4,399,894 | 8/1983 | Tribe | 188/71.9 |
| 4,429,768 | 2/1984 | Margetts et al. | 188/71.9 |

Primary Examiner—Thomas R. Hannon
Attorney, Agent, or Firm—Scrivener and Clarke

[57] ABSTRACT

A bearing wherein the size of the rotatable components, i.e. balls or needle rollers, can be maximized while the cage dimensions are minimized, thus aiding overall design for a mechanical device in which the bearing is located. The bearing comprises a cage constructed of flat flexible material, the cage having a generally U-shaped transverse cross-section with a number of rotatable components located between the arms of the generally U-shaped cross-section cage, each component extending partially through aligned apertures in each of said arms. When inserted between two facing helical surfaces and in engagement with both the cage automatically conforms to the pitch of the helical surfaces without the necessity of being pre-shaped to conform thereto.

11 Claims, 3 Drawing Sheets